United States Patent
Chen (10) Patent No.: US 12,289,248 B2
(45) Date of Patent: Apr. 29, 2025

(54) RESOURCE-SHARING SYSTEM WITH CRYPTOGRAPHICALLY ENFORCED FAIR ACCESS

(71) Applicant: SOFTIRON LIMITED, Chilworth (GB)

(72) Inventor: Mark Chen, Newark, CA (US)

(73) Assignee: SOFTIRON LIMITED, London (GB)

( * ) Notice: Subject to any disclaimer, the term of this patent is extended or adjusted under 35 U.S.C. 154(b) by 0 days.

(21) Appl. No.: 18/322,849

(22) Filed: May 24, 2023

(65) Prior Publication Data

US 2023/0388246 A1 Nov. 30, 2023

Related U.S. Application Data

(60) Provisional application No. 63/345,497, filed on May 25, 2022.

(51) Int. Cl.
| | |
|---|---|
| *H04L 47/762* | (2022.01) |
| *H04L 9/32* | (2006.01) |
| *H04L 47/80* | (2022.01) |

(52) U.S. Cl.
CPC .......... *H04L 47/762* (2013.01); *H04L 9/3247* (2013.01); *H04L 47/803* (2013.01)

(58) Field of Classification Search
CPC .... H04L 47/762; H04L 9/3247; H04L 47/803
See application file for complete search history.

(56) References Cited

U.S. PATENT DOCUMENTS

| | | | | |
|---|---|---|---|---|
| 2004/0059669 | A1* | 3/2004 | Togher | G06Q 40/03 705/37 |
| 2007/0094664 | A1* | 4/2007 | So | G06F 9/485 718/103 |
| 2012/0078668 | A1* | 3/2012 | Hirose | G06Q 30/0601 705/5 |
| 2016/0359846 | A1* | 12/2016 | Yoshimuta | H04L 63/0807 |
| 2017/0093741 | A1* | 3/2017 | Chin | H04L 47/629 |
| 2021/0049691 | A1* | 2/2021 | Howorka | G06Q 40/04 |
| 2021/0119764 | A1* | 4/2021 | Meghji | H04L 9/3239 |
| 2021/0119805 | A1* | 4/2021 | Zhuo | H04L 9/3239 |
| 2022/0138286 | A1* | 5/2022 | Zage | H04L 63/0428 726/26 |
| 2022/0180439 | A1* | 6/2022 | Merold | G06Q 40/04 |
| 2023/0073427 | A1* | 3/2023 | Berg | G06Q 20/389 |

OTHER PUBLICATIONS

Kroft, Steve, "Is the U.S. Stock Market Rigged," CBS News, URL: https://www.cbsnews.com/news/is-the-us-stock-market-rigged/, 15 pages, Mar. 30, 2014.

\* cited by examiner

*Primary Examiner* — Chris Parry
*Assistant Examiner* — Steven C Nguyen
(74) *Attorney, Agent, or Firm* — Slayden Grubert Beard PLLC (57) ABSTRACT

An article of manufacture includes instructions that, when loaded and executed by a processor, configure the processor to, at a coordinator electronic device, initiate a round of electronic device resource requests from a plurality of electronic devices, receive a request for an electronic device resource from each of the electronic devices, provide a fair access scheme for access to the electronic device resource for each of the electronic devices, and provide a proof to each of the electronic devices that the fair access scheme was used in providing access to the electronic device during the round.

16 Claims, 9 Drawing Sheets

RESOURCE-SHARING SYSTEM WITH CRYPTOGRAPHICALLY ENFORCED FAIR ACCESS

PRIORITY

The present application claims priority to U.S. Provisional Patent Application No. 63/345,497 filed May 25, 2022, the contents of which are hereby incorporated in their entirety.

FIELD OF THE INVENTION

The present disclosure relates to electronic devices and, more particularly, to a resource-sharing system of electronic devices with cryptographically enforced fair access.

BACKGROUND

Competitive-access-based information systems and electronic devices impart advantages to participants with close physical proximity to a given resource. This may be particularly true for on-demand resources. Such resources may include, for example, processor time, memory, storage, software calls, or software execution. The closer the requesting electronic device to the resource, the faster the request may be made by the electronic device at the expense of other electronic devices that are further away from the resource. The reason for this may be that greater proximity entails shorter signal-propagation time and, consequently, the ability to react to resource or environment status or state changes faster than other electronic devices whose signal propagation time may be longer. This advantage may translate to an unfair advantage to certain participant electronic devices in accessing the resource.

One approach to solving this problem may be to artificially increase signal-propagation time between certain participant electronic devices and the resource. However, this approach may have some drawbacks. This approach does not equalize access. It only reduces disparities by slightly delaying certain participant electronic devices. Overall, it slows access. The artificial delay might not be easily or dynamically configurable. The approach does not prevent collusion between the resource owner and any participant electronic device. Participant electronic devices receive no proof of fairness of the handling of signal propagation delays.

Embodiments of the present disclosure address one or more of these issues.

DETAILED DESCRIPTION

Embodiments of the present disclosure may address or remediate problems discovered by inventors of embodiments of the present disclosure.

Figure 1:
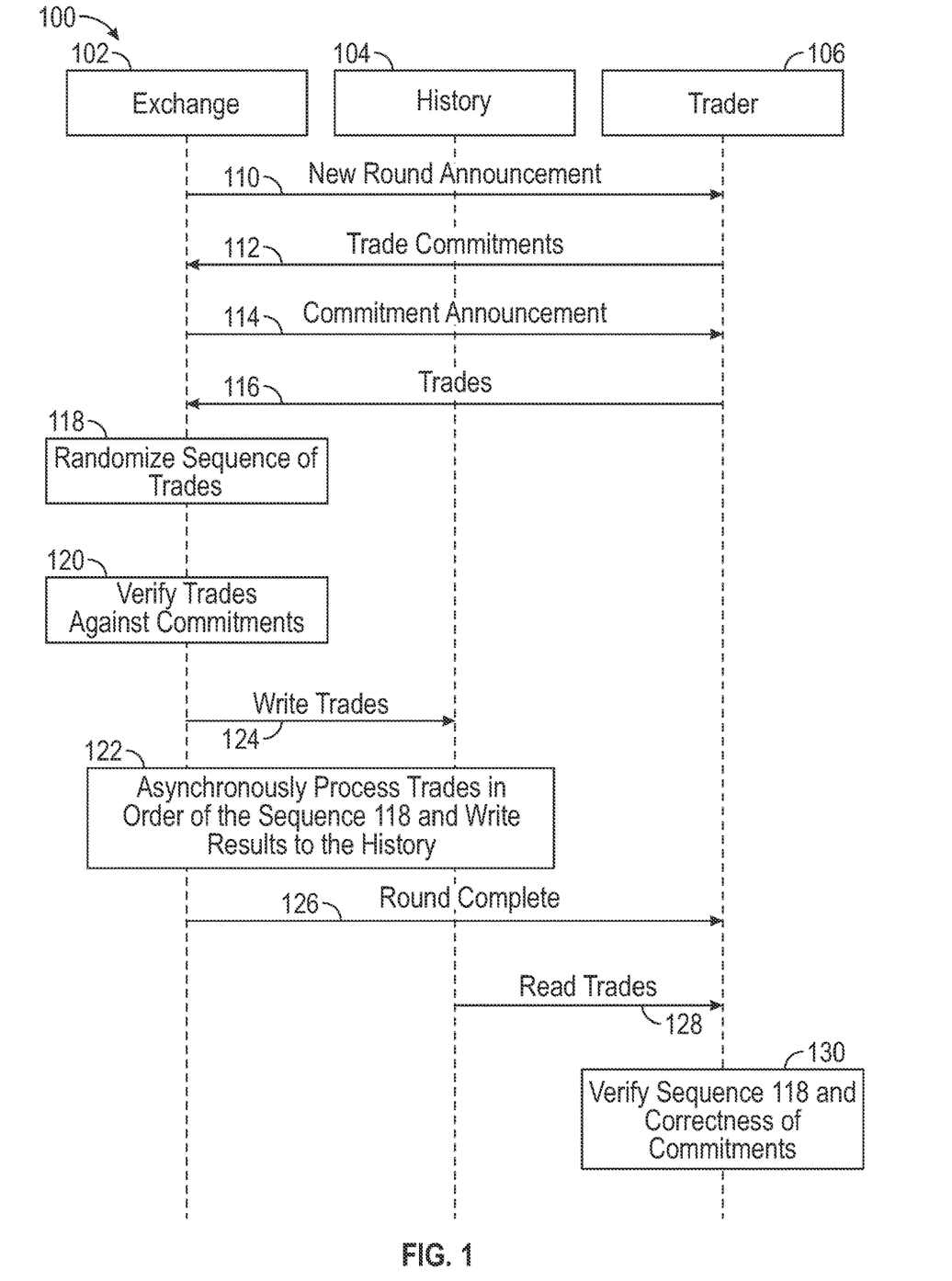
FIG. 1 is an illustration of a high-level data flow of a resource-sharing system of electronic devices with cryptographically enforced fair access, according to embodiments of the present disclosure.

FIG. 1 is an illustration of a high-level data flow of a resource-sharing system 100 of electronic devices with cryptographically enforced fair access, according to embodiments of the present disclosure.

System 100 may provide a cryptographic protocol between a resource owner (such as coordinator 102) and one or more participant electronic devices that are attempting to access resources of the resource owner, denoted as accessors 106. Although described as separate electronic devices or the like, coordinator 102 and accessors 106 may be on a same electronic device or the like. Coordinator 102 and accessors 106 may be implemented in any suitable manner, such as by electronic devices, servers, computers, software, or instructions in a non-transitory machine-readable electronic medium for execution by a processor.

Coordinator 102 may control access to any suitable resources, such as memory, processing capability, execution of software, or requested operation or execution of a software process. Accessors 106 may be configured to communicate with the coordinator 102 to send and receive information through any suitable networks and network protocol. System 100 may include any suitable storage components, represented as history 104, to store a record of the protocol operations of system 100. Each of these components can be implemented individually as a separate, self-contained system, or can be used to augment an existing system. Any component of system 100 (coordinator 102, history 104, or accessor 106) may be physically co-located with any other component or may be physically separate.

The protocol steps of system 100 may be as follows. Messages may be sent by any suitable protocol.

Coordinator 102 may announce (to each accessor 106) a start of new transaction round for accessing a given resource of the system by sending message new round announcement 110. A transaction may include a request for a resource of coordinator 102 by an instance of accessor 106. Each transaction may include a unique transaction number for each set of resources that are requested. Moreover, each transaction may include a list of resources that are requested, or "orders".

Each accessor 106 may send a cryptographic commitment of (zero or more) transactions (each transaction including the unique transaction number and orders) to the coordinator 102 using a transaction commitments 112 message. The transaction commitments contain a list of the transaction identifiers of each of the subsequent resource request or orders. The transaction commitment message 112 may include a list of transaction identifiers, and then a list of orders associated with such transactions may be sent in transactions message 116, discussed below. The commitment may be "cryptographic" in that it is secured using any suitable cryptographic scheme or encryption such that the commitments can be attributed anonymously to a specific accessor; that is, cryptographically signed.

Coordinator 102 may publish a list of commitments received at 112 from all accessors 106, to each accessor 106 using a commitment announcement 114. The list of commitments may be an aggregation of the commitments of transactions made by all of accessors 106.

Each accessor 106 may verify commitment announcement 114. Accessor 106 may, for example, verify that commitment announcement 114 includes the same transaction commitment 112 that the specific instance of accessor 106 provided to coordinator 102. Further, accessor 106 may verify the signing key of coordinator 102 to confirm the identity of coordinator 102. Upon such verification, accessor 106 may respond with its transactions using transactions 116 message. Each transaction may include a transaction number, sent in the transaction number list as part of the transaction commitment earlier, plus a list of specific resource requests in the form of orders. The transactions are also cryptographically processed. e.g. cryptographically signed, such that coordinator 102 can validate the identity of accessor 106. This ensures that resource request come from a validated accessor 106. In one embodiment, transactions 116 may be publicly provided to all accessors 106.

Coordinator 102 may then create a randomized sequence 118 of all transactions 116, which includes a list of resource requests, received from all accessors 106. This may be performed by using a fixed algorithm and random inputs from all accessors 106.

Coordinator 102 verifies that each transaction 116 was previously requested in transaction commitments 112 by comparing transaction 116 instances against the corresponding commitment 112 using process 120. Coordinator 102 processes transactions 116 in the order established by sequence 118 by indelibly recording them in a publicly viewable history 104, at 124. This may be done, for example, by writing transactions 116 in the order of 118 to a distributed ledger or to a database.

When finished, coordinator 102 announces the end of the round using round complete message 126. Accessors 106 read transactions (written at 124) from history 104 using read transactions message 128. Accessors 106 verify sequencing and content of transactions against commitment announcement 114 using process 130. This verification may include comparing transactions 116 against write transactions 124 to verify the individual resource requests.

The above steps may be repeated for additional rounds for subsequent attempted access of the resource.

In a separate process 122, coordinator 102 may asynchronously read transactions from the history 104 in the same order in which they were written, perform any associated execution functions, and write results back to history 104. History 104 may be thus the authoritative record of all activity.

In the following protocol description, it may be assumed that all participating accessors 106 are registered with the coordinator 102, and that all public keys and identifiers used in system 100 are therefore known by verifying parties. History 104 may be an indelible, ordinality-preserving, authoritative record of all relevant system activity, viewable by coordinator 102 and all accessors 106.

Figure 2:
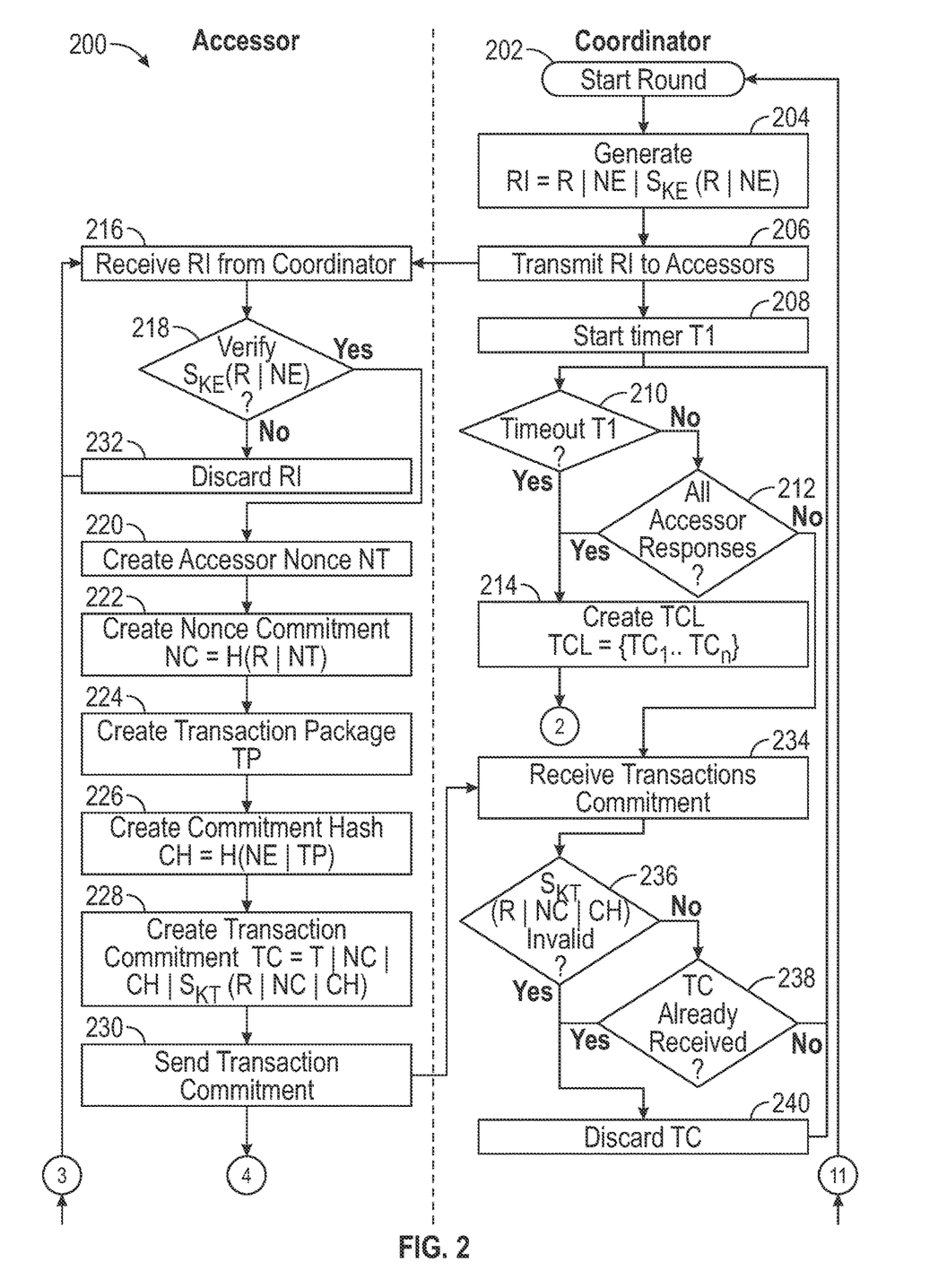
FIG. 2 is an illustration of a flowchart showing operation of the system for a transaction commitment phase, according to embodiments of the present disclosure.

FIG. 2 shows the transaction commitment 200 portion of the protocol, according to embodiments of the present disclosure.

Figure 5A:
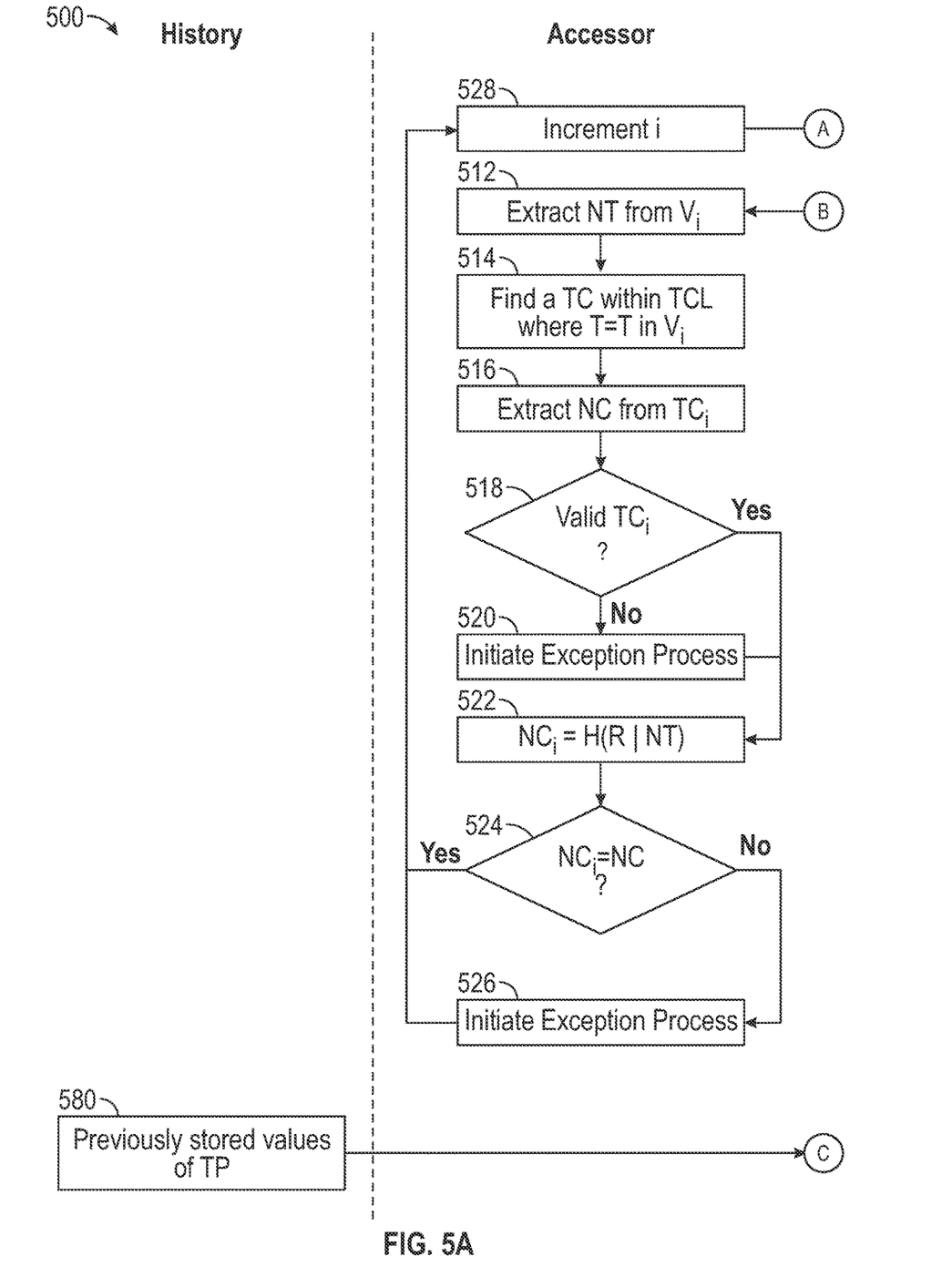
FIGS. 5A, 5B, and 5C are an illustration of a flowchart showing operation of the system for a transaction verification phase, according to embodiments of the present disclosure.

At step 202, coordinator 102 may commence the transaction round. This can be triggered when system 100 is initialized, or as a result of a previously concluded transaction round from step 504 in FIG. 5.

At step 204, coordinator 102 may create a random coordinator nonce NE and generates the round initiator RI, given as:

$$RI=R|NE|S_{KE}(R|NE)$$

where | is a concatenation or other suitable mathematical operator, R is the round number (incremented from the previous round or 0 if this is the first round), and $S_{KE}(R|NE)$, which may be the output of any suitable cryptographic signature operation over R|NE with a coordinator signing key, KE.

At step 206, coordinator 102 may use RI to create the new round announcement message (FIG. 1, 110) and send it to all accessors 106.

At step 208, coordinator 102 may start any suitable timer, such as timer T1. Timer T1 may be used to set a limit for accessor 106 responses to the new round announcement message (FIG. 1, 110).

At step 210, coordinator 102 may determine if timer T1 has timed out. If it has, coordinator 102 may execute step 214. Otherwise, coordinator 102 may execute step 212.

At step 212, coordinator 102 may verify if transaction commitment messages (FIG. 1, 112) have been received from each accessor 106. If messages have been received from all accessors 106, then step 214 may be executed. Otherwise, step 234 may be executed.

At step 214, coordinator 102 may either have received all transaction commitment messages (FIG. 1, 112) for all accessors 106, or timer T1 may have timed out. Coordinator 102 may create the transaction commitment list, TCL, given as:

$$TCL=\{TC_1, \ldots TC_n\}$$

where n is the number of individual, verified transaction commitments (TC) values received in step 234, discussed below. See the example in Table 1: Transaction Commitment List, below.

Referring to accessor operation, at step 216, a given accessor 106 may receive a new round announcement message (FIG. 1, 110) from coordinator 102.

At step 218, each accessor 106 may extract the contents of RI (round initiator) and and coordinator nonce NE from new round announcement message 110 to verify $S_{KE}(R|NE)$. Such verification may be made via a companion key to the key (KE) used at step 204 by coordinator 102. For example, the key (KE) used at step 204 may be a private key, while the key used by accessor 106 to verify the signature of RI may be the public key corresponding to such a private key. If verification fails (i.e., if signature verification fails, or if R is not greater than every previously received R), then step 232 may be executed. Otherwise, step 220 may be executed next.

At step 220, accessor 106 may create an accessor nonce NT.

At step 222, accessor 106 may create the nonce commitment NC=H(R|NT) where H(R|NT) is the output of a cryptographic hash operation over R|NT.

At step 224, each accessor 106 may create a transaction package TP, which may include all transactions that it wishes to enter for coordinator 102.

At step 226, accessor 106 may compute a commitment hash, CH=H(NE|TP). The function hash H may be any suitable cryptographic or encryption function, and NE may be the coordinator nonce retrieved in step 218.

At step 228, accessor 106 may create the transaction commitment (TC=T|NC|CH|$S_{KT}$(R|NC|CH)) using the commitment hash (CH) generated in step 226, where T is the accessor's identifier, KT is the accessor's signing key, and $S_{KT}$ is any suitable signing, cryptographic, or encryption function using KT.

Figure 3A:
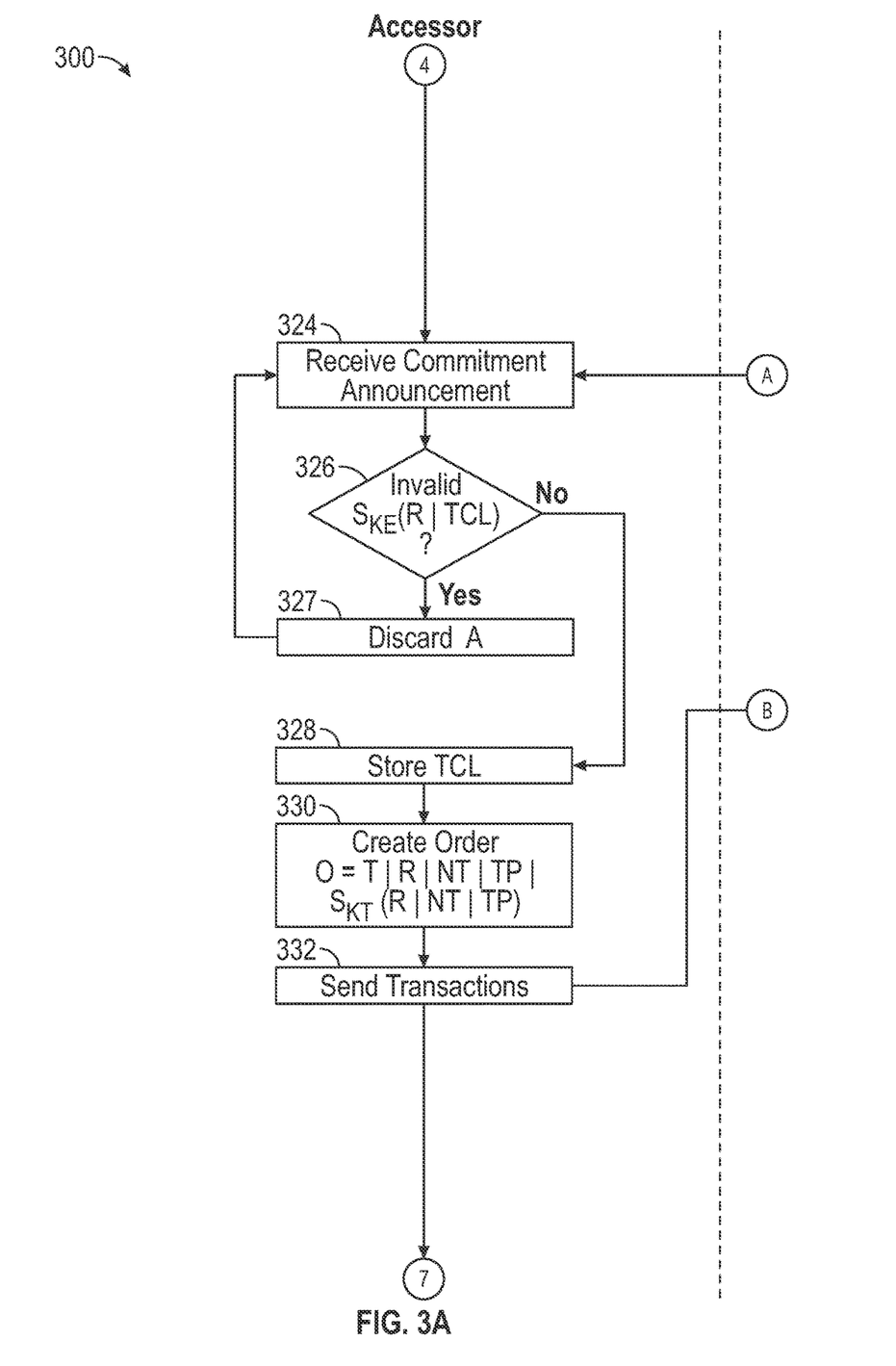
FIGS. 3A and 3B are an illustration of a flowchart showing operation of the system for a sequencing phase, according to embodiments of the present disclosure.

At step 230, accessor 106 may use the transaction commitments TC to create the transaction commitment message (FIG. 1, 112) and send it to coordinator 102. Then, FIG. 3, step 324 may be executed.

At step 232, accessor 106 may discard RI, and then execute step 216.

Returning to execution of coordinator 102, at step 234, coordinator 102 may receive a transaction commitment message (FIG. 1, 112) from accessor 106.

At step 236, coordinator 102 extracts the contents of TC received in the previous step and verifies $S_{KT}(R|NC|CH)$, using the same R value that it sent in step 206 and a suitable key counterpart to KT. Counterparts to keys may include the other of a public/private pair, a shared secret, or any other suitable cryptographic mechanism. If invalid, then step 240 may be executed next, otherwise step 238 may be executed next.

At step 238, coordinator 102 may determine if a valid TC has previously been received in this round for accessor 106 with a specific value for T. If a valid TC has already been received, then step 240 may be executed. Otherwise step 210 may be executed. This creates a loop that may start the processing of transaction commitment messages (FIG. 1, 112) again.

At step 240, coordinator 102 may discard the invalid TC from accessor 106 and execute step 210. This may create a loop that may start the processing of transaction commitment messages (FIG. 1, 112) again.

Figure 3B:
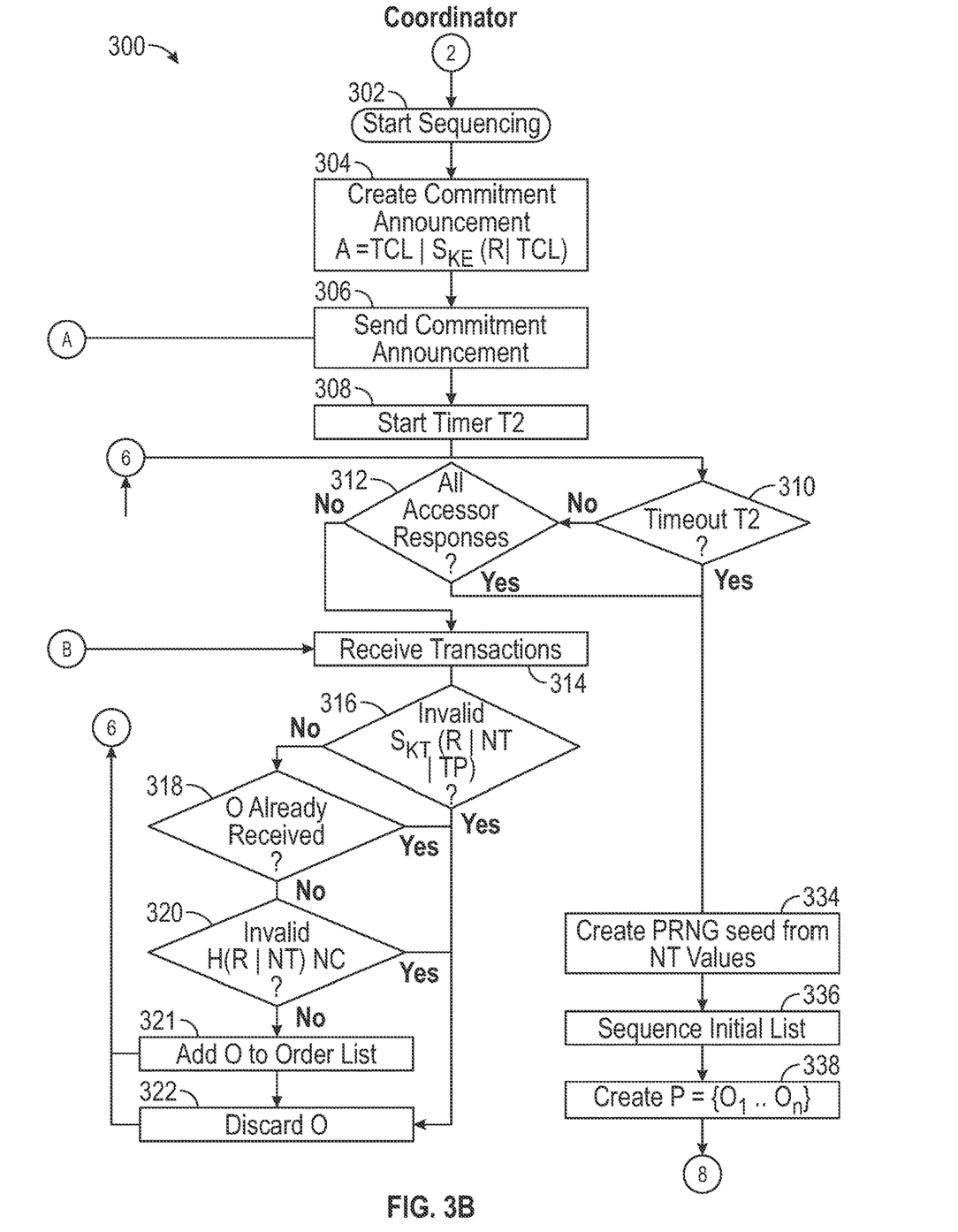

FIGS. 3A and 3B show a sequencing 300 portion of the protocol, according to embodiments of the present disclosure.

At step 302, the sequencing portion may be started. This may be triggered from FIG. 2, step 214.

At step 304, coordinator 102 may create a commitment announcement A, given as: $A=TCL|S_{KE}(R|TCL)$, wherein TCL (transaction commitment list) was created in step 214.

At step 306, commitment announcement A may be sent to accessors 106 using a commitment announcement message (FIG. 1, 114).

At step 308, coordinator 102 may start any suitable timer, such as coordinator timer T2.

At step 310, coordinator 102 may check to see if coordinator timer T2 has timed out. If it has timed out, step 334 may be executed next. Otherwise, step 312 may be executed.

At step 312, coordinator may check to see if valid orders O have been received from all accessors 106. If they have, step 334 may be executed. Otherwise, step 314 may be executed.

At step 314, coordinator may receive a transactions message (FIG. 1, 116) from a given accessor 106.

At step 316, coordinator 102 may extract the contents of O received from a given accessor 106 using transactions message (FIG. 1, 116) and verify $S_{KT}(R|NT|TP)$, using the same R value that was sent in step 206 and the key counterpart to KT. If it is invalid, then step 322 may be executed next. Otherwise, step 318 may be executed.

At step 318, coordinator 102 may determine if the order from the given accessor 106 has already been received by comparing it to the order list generated in step 321, discussed below. If it has, step 322 may be executed next. Otherwise, step 320 may be executed. For each individual transaction (an accessor 106 can send multiple transaction messages in a given round) the order may be unique. This stops accessors trying to unfairly create multiple transactions with the same order in it. This would dilute the randomness of the list generation later in step 338.

At step 320, coordinator 102 additionally verifies that $H(R|NT)=NC$ (for the NC value received for this accessor 106 in step 234). If the two are not equal, then step 322 may be executed. Otherwise, step 321 may be executed.

At step 321, the validated and unique order may be added to the order list maintained by coordinator 102. Step 310 may be then executed. The latter may create a loop enabling coordinator 102 to continue to accept transactions messages (FIG. 1, 116) from accessors 106.

At step 322, the received transactions message (FIG. 1, 116) from the given accessor 106 may be discarded and coordinator 102 may continue to accept transactions messages (FIG. 1, 116) from accessors 106 by executing step 310.

In the accessor 106, at step 324, accessor 106 may receive a commitment announcement message (A) (FIG. 1, 114).

At step 326, accessor 106 may extract the contents of A received from coordinator 102 in commitment announcement message (FIG. 1, 114) sent in step 306 and verify $S_{KE}(R|TCL)$ using a public key counterpart or other counterpart to KE used by coordinator 102. If it is invalid, then step 327 may be executed. Otherwise, step 328 may be executed.

At step 327, accessor 106 may discard A then execute step 324.

At step 328, the TCL value extracted in step 326 may be stored for use in step 514.

At step 330, accessor may create its order using $O=T|R|NT|TP|S_{KT}(R|NT|TP)$.

At step 332, the order may be sent by accessor 106 to coordinator 102 using transactions message (FIG. 1, 116).

At coordinator 102 and at step 334, coordinator 102 may create a seed for a cryptographically secure pseudo-random number generator, or PRNG, by combining NT values received from accessors 106 in transactions messages (FIG. 1, 116). This seed may be created in any entropy-preserving, deterministic way, such as by xor-ing all NT values together.

At step 336, coordinator 102 may in some publicly known, deterministic way (e.g., by ascending numeric value or by accessor identifier) sequence the orders it has received.

Figure 4A:
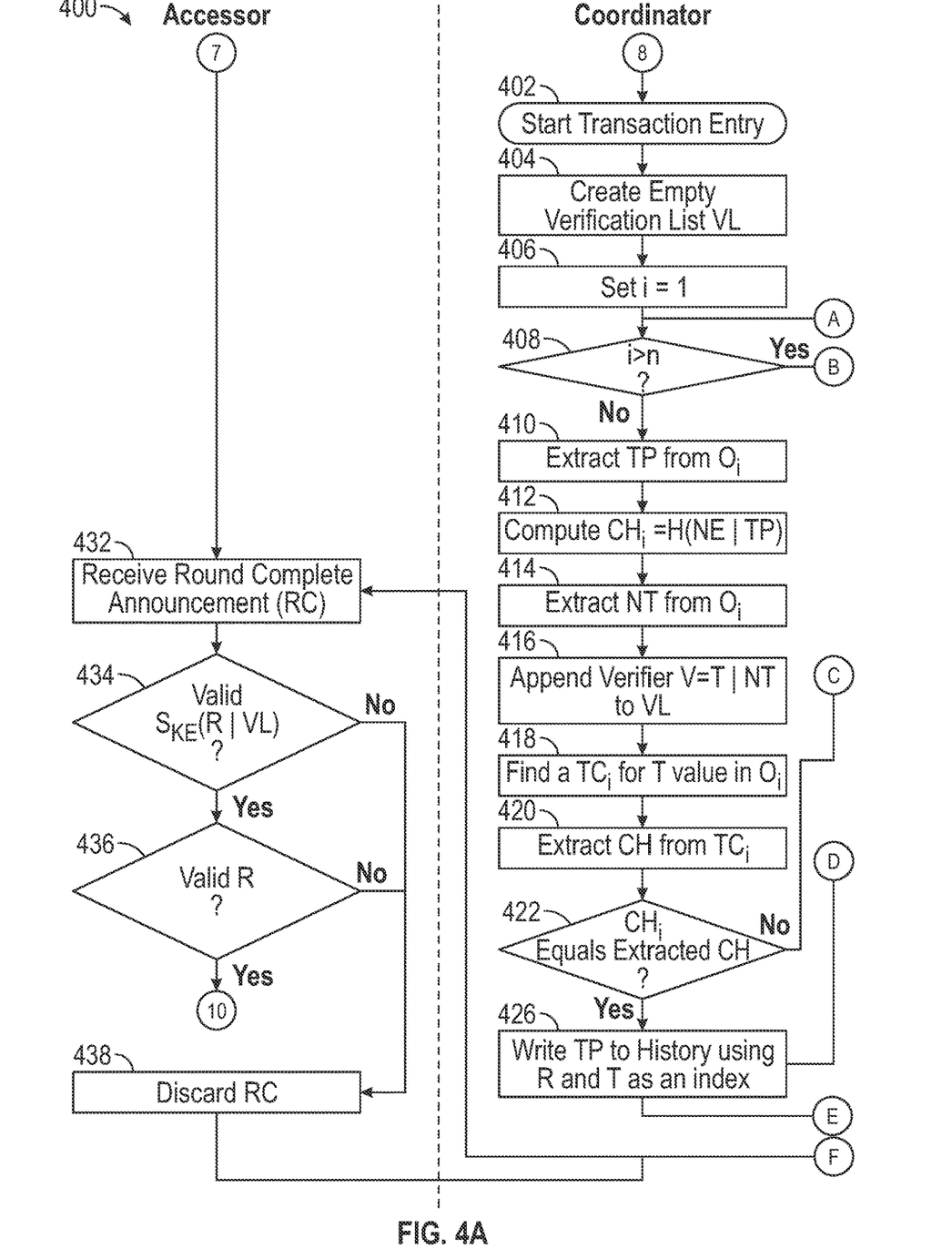
FIGS. 4A and 4B are an illustration of a flowchart showing operation of the system for a transaction entry phase, according to embodiments of the present disclosure.

At step 338, coordinator 102 then may use the seeded PRNG from step 334 in a publicly known, random-permutation algorithm (such as Fisher-Yates) to generate a random permutation $P=\{O_1 \ldots O_n\}$ of all orders, where n is the number of accessors participating in this round of the protocol (and from whom a verified 0 value was received in step 314). See the example Table 2: Randomized Permutations of Orders, below. Step 402 may be executed next.

Figure 4B:
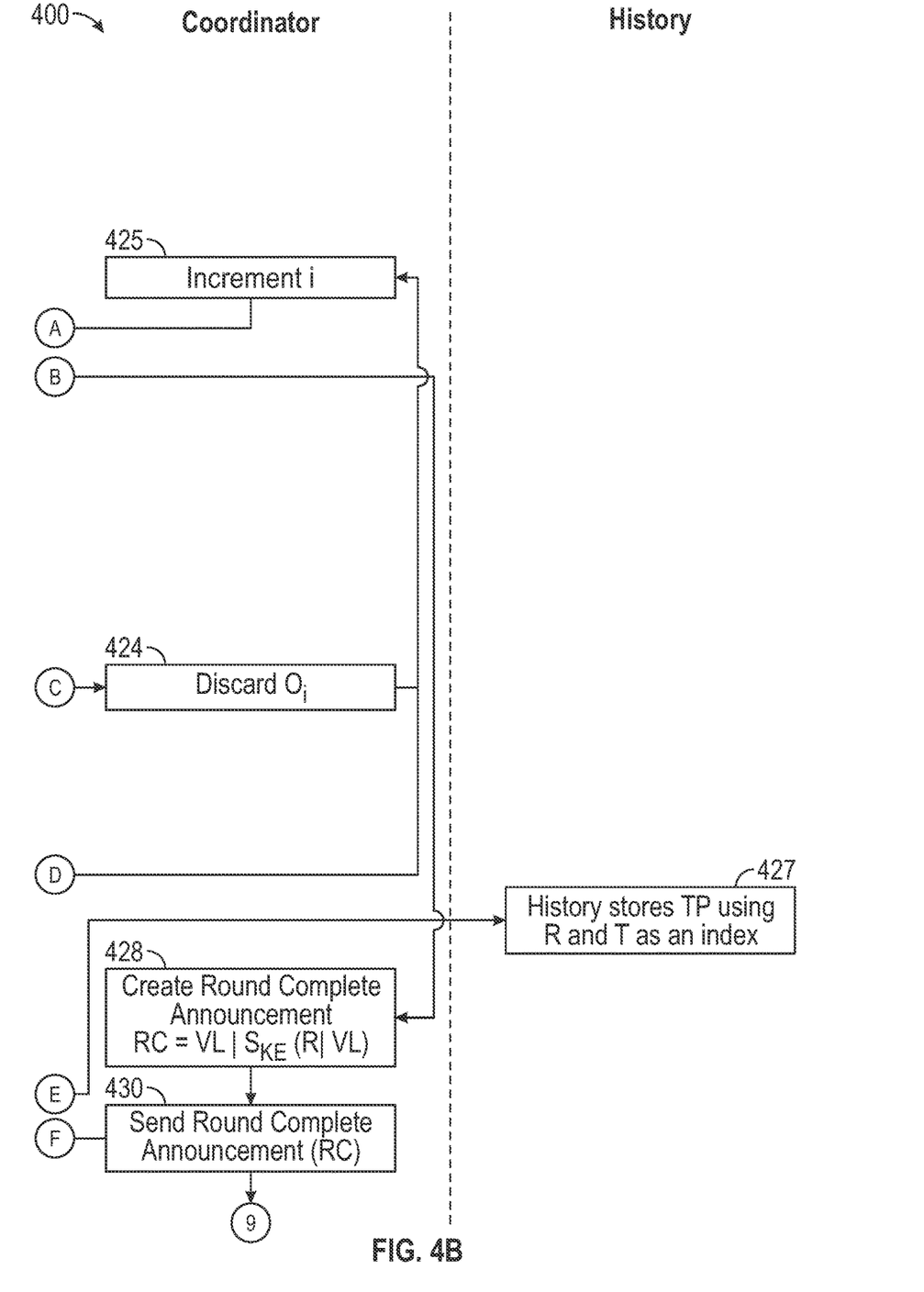

FIGS. 4A, 4B, 4C show the transaction entry 400 portion of the protocol, according to embodiments of the present disclosure.

At step 402, coordinator 102 may commence the transaction entry phase of the protocol.

At step 404, coordinator 102 may create an empty verification list VL.

At step 406, coordinator 102 may set any suitable counter i to 1.

At step 408, the current value of i may be compared to n, where n is the number of valid orders that coordinator 102 has received at step 314. If i is greater than n, then VL has been completed and step 428 may be executed. Otherwise, coordinator 102 may execute step 410.

At step 410, coordinator 102 may extract TP from $O_i$.

At step 412, coordinator 102 may compute $CH_i$=H(NE|TP), where NE is the same value that was sent in step 206.

At step 414, coordinator 102 may extract NT from $O_i$.

At step 416, coordinator 102 may append a verifier (V=T|NT) to VL.

At step 418, coordinator 102 may find a $TC_i$ (among the TC values received in step 234) whose T value equals the T value in $O_i$.

At step 420, coordinator 102 may extract CH from TCi.

At step 422, coordinator 102 may compare CH from step 420 to $CH_i$ from step 412. If CH equals $CH_i$, then step 426 may be executed next. Otherwise, step 424 may be executed.

At step 424, coordinator 102 may discard $O_i$.

At step 425, coordinator 102 may increment counter i. Step 408 may be executed next, creating a loop to iterate through each $O_i \in P$.

At step 426, coordinator 102 may write TP to history 104, indexed to the round number R and the accessor's identifier T using the write transactions message (FIG. 1, 124). Transactions on history 104 may be executed asynchronously and sequentially in a separate process, and results are written back to the history 104. Step 425 may be executed next.

At step 427, history 104 may store TP using R and T as an index.

At step 428, coordinator 102 may create round complete announcement as follows: RC=VL|$S_{KE}$(R|VL).

At step 430, coordinator may send round complete announcement, using round complete message (FIG. 1, 126) to all participating accessors 106. Step 502 may be executed next.

At step 432, accessor 106 may receive the round complete announcement, using round complete message (FIG. 1, 126).

At step 434, accessor 106 may extract the contents of RC and verify $S_{KE}$(R|VL) using the public or other counterpart to KE. If the signature is valid, step 436 may be executed. Otherwise, step 438 may be executed.

At step 436, accessor 106 may verify that R is the same value received at step 216. If it is the same value, then step 506 may be executed. Otherwise step 438 may be executed.

At step 438, accessor 106 may discard RC and execute step 432.

Figure 5B:
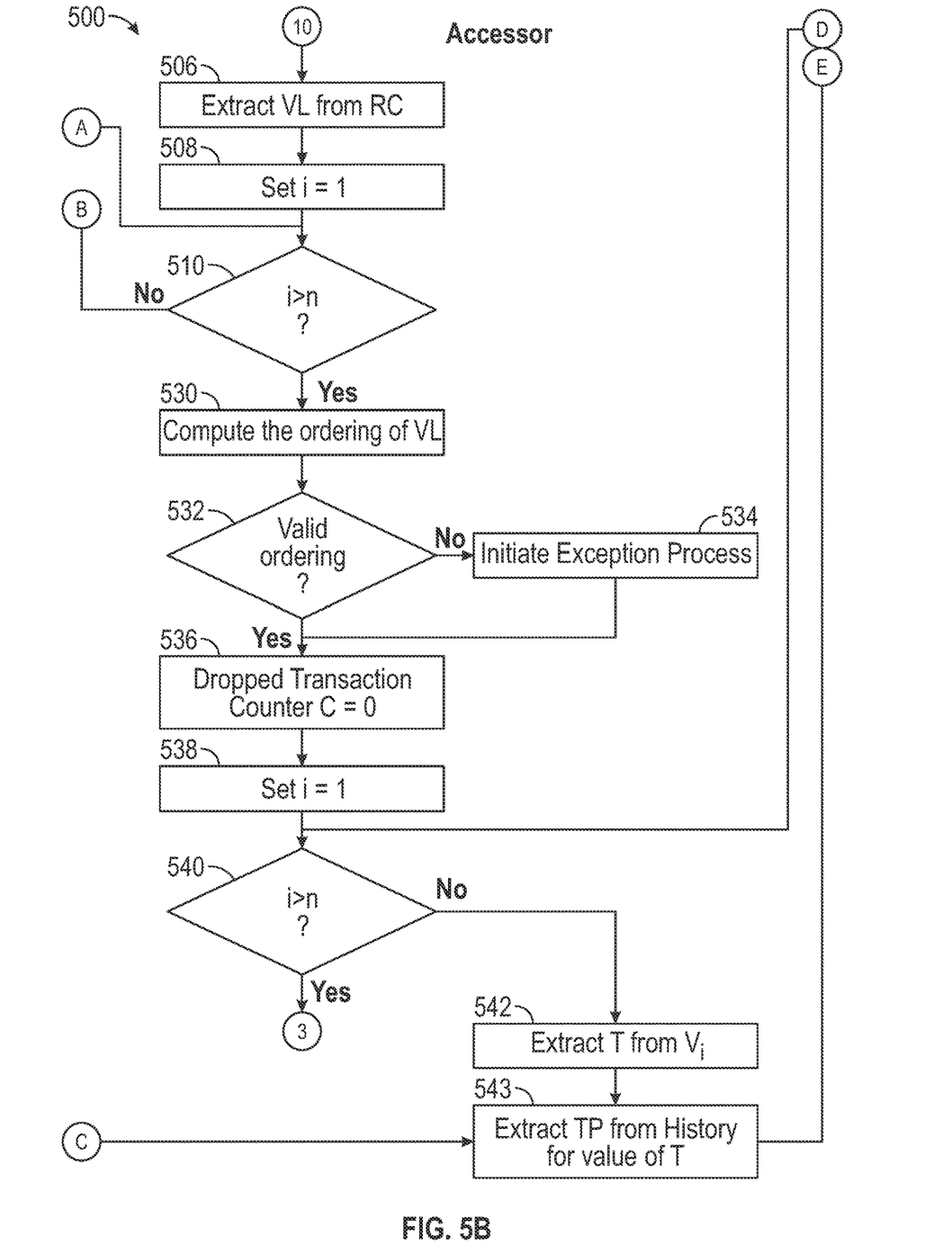
Figure 5C:
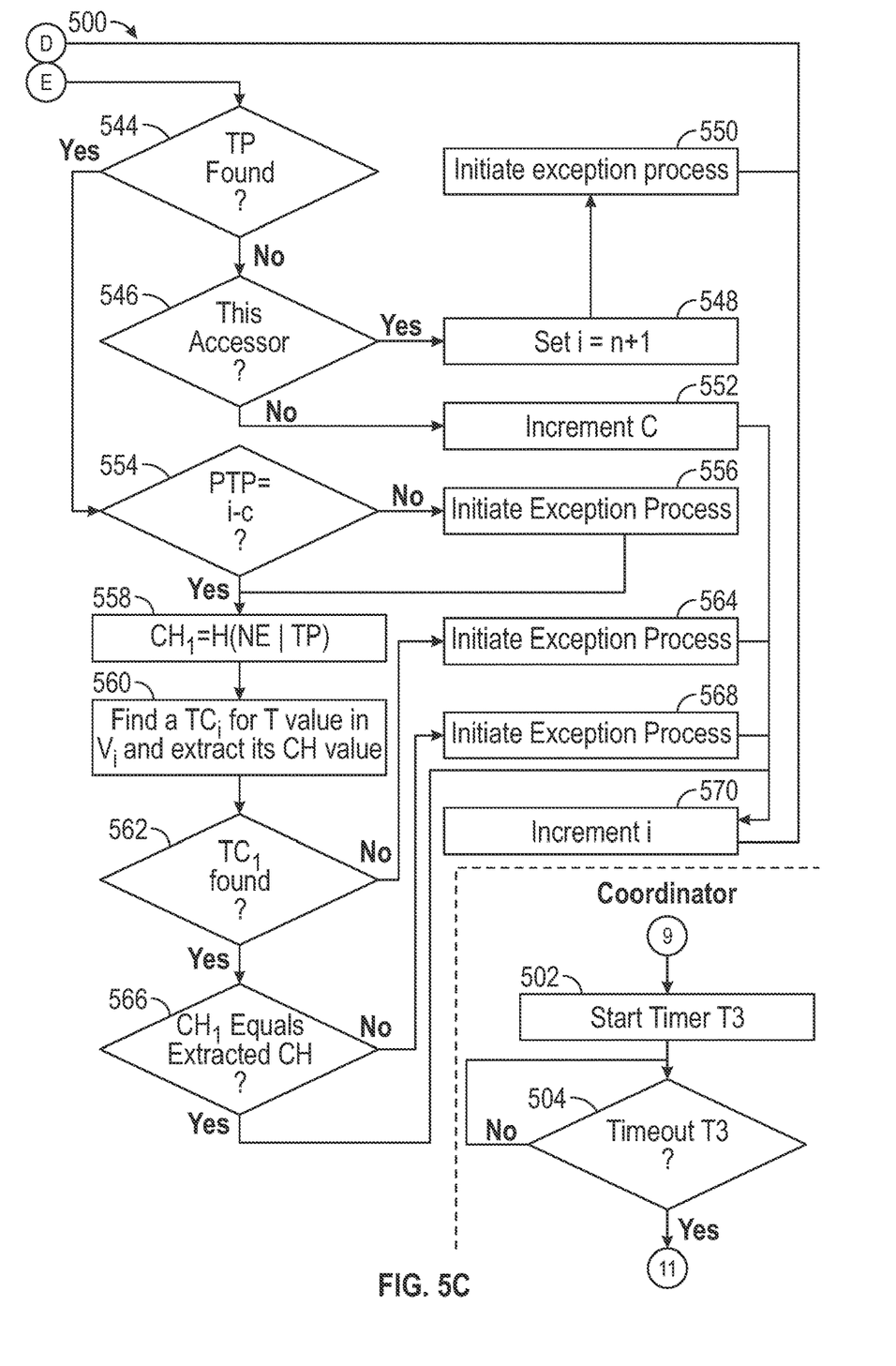

FIGS. 5A, 5B, and 5C show the transaction verification 500 portion of the protocol, according to embodiments of the present disclosure.

At step 502, coordinator 102 may start any suitable timer T3. Timer T3 may be set to some positive time value in order to assist protocol synchronization. For example, this extra time may allow accessors 106 to complete verifications. T3 may be set to zero, for example, in which case the next round commences nearly immediately in step 202. In other words, accessor verifications in this protocol phase may be performed synchronously or asynchronously with other phases of the protocol. T3 may be set to eliminate an advantage that one or more accessors 106 may have by being closer to or further from coordinator 102 in terms of network speed, access, or latency. By providing T3, coordinator 102 may equalize access across the electronic device resource of coordinator 102 to eliminate latency inequalities between the coordinator 102 electronic device and the electronic devices of accessors 106. Moreover, T3 may be sufficient for the electronic devices of accessors 106 to provide respective requests. In addition, coordinator 102 may be batch process requests upon expiration of the time limit of T3 or upon receipt of all expected requests. T3 may be dynamically adjustable, and may be adjustable for respective ones of accessors 106 based upon network latency between the coordinator electronic device 102 and the respective electronic devices of accessors 106. That is, given greater latency between coordinator 102 and a given accessor 106, the time limit T3 may be adjustable for the given accessor 106.

At step 504, coordinator 102 may wait for timer T3 to expire then execute step 202 to start a new round.

At step 506, accessor 106 may extract VL from RC received at step 432.

At step 508, accessor 106 may initialize any suitable counter i to 1.

At step 510, accessor 106 may check if i is greater than n, where n is the number of V values in VL. If it is, then step 530 may be executed, otherwise step 512 may be executed.

At step 512, accessor 106 may extract NT from $V_i$.

At step 514, accessor 106 may find a $TC_i$ within TCL (received in step 324) whose T value equals the T value in $V_i$.

At step 516, accessor 106 may attempt to extract NC from $TC_i$.

At step 518, accessor 106 may verify that a valid $TC_i$ value was found. If not (meaning that a used accessor nonce was not committed), step 520 may be executed next. Otherwise, step 522 may be executed next.

At step 520, accessor 106 may initiate an exception process. Note that while processing may continue from this step, the results of the entire round may be invalid due to the determination that an uncommitted accessor nonce was used at step 334. This may represent a malicious attempt to thwart the fair share processing of system 100. Moreover, steps 518 and 520 may be executed before steps 514, 516, or 518, and steps 514, 516, 518 may be conditionally or selectively executed if accessor 106 verifies that the $TC_i$ value was a valid $TC_i$ value and was found.

At step 522, accessor 106 may compute $NC_i$=H(R|NT).

At step 524, accessor 106 may verify whether $NC_i$=NC. If not (meaning that the committed accessor nonce differs from the one that was used), step 526 may be executed. Otherwise, step 528 may be executed.

At step 526, accessor 106 may initiate an exception process. Note that while processing may continue from this step, the results of the entire round may be invalid due to the determination that an uncommitted accessor nonce was used at step 334.

At step 528, accessor 106 may increment counter i. This may create a loop to iterate through VL values.

At step 530, accessor 106 may repeat the coordinator's procedure in steps 334-338 (using NT values contained in VL) to compute the ordering of VL.

At step 532, accessor 106 may compare computed ordering against actual ordering (and also verify that the value of this accessor 106 is in the list). If identical, step 536 may be executed, otherwise step 534 may be executed. Note that if exception conditions at steps 520 or 526 were triggered, the results of this round are already known to be invalid, regardless of this test.

At step 534, accessor 106 may initiate an exception process.

At step 536, accessor 106 may set a dropped transaction counter, C, equal to zero.

At step 538, accessor 106 may set loop counter i to 1.

At step 540, accessor 106 may check if i is greater than n where n is the number of V values in VL. If it is, then step 216 may be executed, otherwise step 542 may be executed.

At step 542, accessor 106 may extract T from $V_i$.

At step 543, accessor 106 may extract previously stored value of TP from history (as written in step 426) for this round for the value of T using read transactions message (FIG. 1, 128).

At step 544, accessor 106 may verify that the TP belonging to the value of T is found in history 104 (as written in step 426). If it is found, the TP value may be stored for future use and step 554 may be executed next. Otherwise, step 546 may be executed next.

At step 546, accessor 106 checks if T is the accessor's own identifier. If so, step 548 may be executed. Otherwise, step 552 may be executed.

At step 548, accessor 106 may set loop counter i to a value of n+1. This may effectively exit the loop.

At step 550, accessor 106 may initiate an exception process and then execute step 540.

At step 552, accessor 106 may increment C and execute step 570.

At step 554, accessor 106 may set PTP equal to the ordinal position of TP (found at step 544) for this round on history 104. If PTP≠i−C (meaning that the sequence of orders on the history 104 differs from the committed sequence), accessor 106 may execute step 556. Otherwise, accessor 106 may execute step 558.

At step 556, accessor 106 may initiate an exception process.

At step 558, accessor 106 may compute $CH_i$=H(NE|TP), where NE is the same value that was received in step 216.

At step 560, accessor 106 may find a $TC_i$ within TCL (received in step 324) whose T value equals the T value in $V_i$ and extracts its CH value.

At step 562, accessor 106 may verify that $TC_i$ is found. If found, step 566 may be executed next. If not found, meaning that an entered order was not committed, step 564 may be executed.

At step 564, accessor 106 may initiate an exception process and then execute step 570.

At step 566, accessor 106 may compare $CH_i$ (from step 558) to CH from step 560. If CH=$CH_i$, then step 570 may be executed next. If CH≠$CH_i$ (meaning that the entered order differs from the committed order), step 568 may be executed next.

At step 568, accessor 106 may initiate an exception process and then execute step 570.

At step 570, accessor 106 may increment counter i. Step 540 may be executed next and the next V value may be processed.

Data Structures

Throughout the process described above there are several data structures involved in collecting and transmitting the data. Examples are described below.

Transaction Commitment

The following values may reflect the transaction commitments (TC) created in step 226.

TABLE 1

| | | Transaction Commitment List | |
|---|---|---|---|
| T | NC | CH | Signature |
| 1 | 2fd4e1c67a2d28fced 849ee1bb76e7391b9 3eb12 | 245901a3969b4e6d0 d29e3a24d602c592d 80ff52 | 12c63a77cc5cd2f95e301cdc4a5ce4fba3df4092892c a8dad4b8071aa26552cef1e950a13337eac7ad9525 7f11b0be441e1d0d9c3eacd947e09f43b6670a637f |
| 4 | 6ab330df457680165 28f37f34a0511e41c9 8d514 | b398915995ee24649 3066d0ea8e3b26d23 813225 | e6e4127bff2fe35027cdc03a9f29d02717d46ff6669c4 d2905ac6e83ab357aa61040415428697ae3aa15837 a112c7ae48adffdbafcda1cb04579992b06a42eb7 |
| 6 | 243a76d8c48a44630 5b2770fe398d3d9be 4c30fb | 70c4a2f47773c0aea a48f82fef8b5f176a69 d434 | 18da86b1d4a7a57c1b8bbf69a9f5656e98689c0427a 872b64c85f449edfa92e5db3508320cdbcbe33972d9 ffc75bd543284e8f6514c35734f88a4032fe51323f |
| 9 | 2b0b4a90201cff86ef c8a2e8d338bcbad91 7da59 | 5dd09cf566ae56e77f 7f4918c936df6805e4 eeb5 | 9d73d3ed0d9bcb8b001a931e6823355ed5db18a84c d8c3bc562c0e750e31b0777553ba37abaeba7af319 d0b667d3c179cb84f46d231e76b03df90ff1124b2a4f |
| 11 | 0d36fca22dad86eb9 72761463fcf2871b05 ce1a4 | fa6d0f2d115f1b6f312 a57eaa00ffad00cbd7 cd3 | 3e412bf0e95e07c8c4c38696008c2e9853573cc4302 6dc4097f1473bff69b70e513b4fc1cb68cb3b984a863 6c9a1be17c0e09a485fffbffbc9fa783da2e5be7b |
| 15 | 9aed75b730f3d5a28 428372766e63e6028 33c56c | a5a76a8172d767134 be069d6dc53ce3537 cfe7cc | efb5dc640924ad7e6e22c107e9619060426f60ccce2 c81ff12d74da27d197cd8de739ec127ecd4c9e69cffc 33196db45fc6044b59bff5d48ef2ba566b4c0b77c |

Where:

T Accessor identifier provided to accessor 106 by coordinator 102

NC Nonce commitment (created in step 222)

CH Commitment hash (created in step 226)

Signature Part of transaction commitment message (created in step 228)

Randomized Permutation of Orders

Coordinator 102 may use the list of orders it has received from accessor 106 in step 314 to create a randomized permutation of orders, P={O$_1$ . . . O$_n$}, in step 338. Each order (created at step 330) corresponds to one row in the following table of examples:

TABLE 2

Randomized Permutation of Orders

| T | R | NT | TP | Signature |
|---|---|---|---|---|
| 9 | 10 | c20b95d1ad059e 1930b50010f110 d2ff | Transaction A; Transaction B; | c680b8417758eb93d43f8480006f2fa66cd4 0c5178ae322abc6f73c04dbe9e01878dc61 58d663a6c233c2f8dffae1b9111f3b43c03f5 41dc379c2e17311f9e7b |
| 15 | 10 | 304c1097bcaf55f d7f508c1358ba8 1f1 | Transaction A; Transaction B; Transaction C; | 45d08039ebbe4f0695e7a3888f60bfd7e976 92fa6f4fbe1cf936566bafba1e4843f342a6e 2ef51a539abd789020141b45242c92f5a24 4a6072e5513975daf7a8 |
| 1 | 10 | da11e23d171c48 b90380cdd62728 a7e2 | Transaction A; | d42dfe0169dd05bd4073b8bde7d325ffd30d fa364446afa6e72f48b03a89d839b661e38f ec521fbcc0419ca7a20b93405bc9ab859a5 7d8b0109c4fe01be2fcee |
| 4 | 10 | cf43113cd6c7c4 c4336ce241d8e8 b937 | Transaction A; | a1fb84d35b893aa086ea7292319e03a696f 35e76bd8052b62f1a1bb8661474623d616d 247c6a9c16e5d6d615f2d5ff9f38cd31fdc00f 258db0f5267b6f3ebced |
| 11 | 10 | 65f6b030516ef5 4897b14aba496 ef4c5 | Transaction A; | d7750d71590514bfda6e4076878aee1e60f 70a938a6aec38c97ad0b526c5ccd9c8b7b6 b143055be991da634f939d12cc1f4b921ce b67f044e3f8a49d050a05ef |
| 6 | 10 | a59e7387a1def7 fa435eb87a7299 a094 | Transaction A; Transaction B; Transaction C; | bb4e995d47feb83f650674c8d337d0bd726 82cb547c89bb155cb42db6029bdc442d9d7 dc758aa6bb1e0d8bdef9a375e25abfb694a 8fbe16d47c75a9f35deeb8d |

Where:
T Accessor identifier provided to accessor 106 by coordinator 102
R Round number generated by coordinator 102 in step 204.
NT Accessor nonce created in step 220
TP Transaction package created by accessor 106 in step 224
Signature Created by accessor 106 in step 228

Embodiments of the present disclosure may include an article of manufacture comprising a non-transitory machine-readable medium including instructions. The instructions, when loaded and executed by a processor, configure the processor to, at a coordinator electronic device, initiate a round of electronic device resource requests from a plurality of electronic devices, receive a request for an electronic device resource from each of the electronic devices, provide a fair access scheme for access to the electronic device resource for each of the electronic devices, and provide a proof to each of the electronic devices that the fair access scheme was used in providing access to the electronic device during the round.

In combination with any of the above embodiments, the proof to each of the electronic devices may include proof that the request from a given electronic device was unknown to the other electronic devices before access to the electronic device resource was provided to the electronic devices.

In combination with any of the above embodiments, the proof to each of the electronic devices may include proof that the requests of the other electronic devices were unchanged, including by the coordinator electronic device.

In combination with any of the above embodiments, the processor may be further configured to provide a time limit for electronic device resource requests, upon expiration of the time limit or upon receipt of requests from all participating electronic devices, provide the fair access scheme for access to the electronic device resource for each of the electronic devices, and equalize access across the electronic devices to the electronic device resource to eliminate latency inequalities between the coordinator electronic device and the electronic devices.

In combination with any of the above embodiments, the time limit may be sufficient for the electronic devices to provide respective requests.

In combination with any of the above embodiments, the processor may be further configured to batch process the requests upon expiration of the time limit or upon receipt of all expected requests.

In combination with any of the above embodiments, a given electronic device may provide a plurality of electronic device resource requests to be processed in the round.

In combination with any of the above embodiments, the time limit may be dynamically adjustable.

In combination with any of the above embodiments, the time limit may be adjustable for respective electronic devices based upon network latency between the coordinator electronic device and the respective electronic devices.

In combination with any of the above embodiments, the requests and commitments from the electronic devices may be cryptographically signed, the commitments as cryptographically signed may be collected and shared to all of the electronic devices before access to the electronic device resource is granted, and validation access to the cryptographically signed requests may be provided to all of the electronic devices to verify the fair access scheme.

Although example embodiments have been described above, other variations and embodiments may be made from this disclosure without departing from the spirit and scope of these embodiments.

I claim:
1. An article of manufacture comprising a non-transitory machine-readable medium including instructions, the instructions, when loaded and executed by a processor, configure the processor to, at a coordinator electronic device:
- initiate a round of electronic device resource requests from a plurality of electronic devices;
- receive a request for an electronic device resource from each of the electronic devices;
- provide a access scheme for access to the electronic device resource for each of the electronic devices; and
- provide a proof to each of the electronic devices that the access scheme was used in providing access to the electronic device during the round;
- wherein the proof to each of the electronic devices includes proof that the request from a given electronic device was unknown to the other electronic devices before access to the electronic device resource was provided to the electronic devices, and that the requests of the other electronic devices were unchanged, including by the coordinator electronic device.

2. The article of claim 1, wherein the processor is further configured to:
- provide a time limit for electronic device resource requests;
- upon expiration of the time limit or upon receipt of requests from all participating electronic devices, provide the access scheme for access to the electronic device resource for each of the electronic devices; and
- equalize access across the electronic devices to the electronic device resource to eliminate latency inequalities between the coordinator electronic device and the electronic devices.

3. The article of claim 2, wherein the time limit is sufficient for the electronic devices to provide respective requests.

4. The article of claim 2, wherein the processor is further configured to batch process the requests upon expiration of the time limit or upon receipt of all expected requests.

5. The article of claim 4, wherein a given electronic device provides a plurality of electronic device resource requests to be processed in the round.

6. The article of claim 2, wherein the time limit is dynamically adjustable.

7. The article of claim 2, wherein the time limit is adjustable for respective electronic devices based upon network latency between the coordinator electronic device and the respective electronic devices.

8. The article of claim 1, wherein:
- the requests and commitments from the electronic devices are cryptographically signed;
- the commitments as cryptographically signed are collected and shared to all of the electronic devices before access to the electronic device resource is granted; and
- validation access to the cryptographically signed requests is provided to all of the electronic devices to verify the access scheme.

9. A method, performed at a coordinator electronic device, comprising:
- initiating a round of electronic device resource requests from a plurality of electronic devices;
- receiving a request for an electronic device resource from each of the electronic devices;
- providing a access scheme for access to the electronic device resource for each of the electronic devices; and
- providing a proof to each of the electronic devices that the access scheme was used in providing access to the electronic device during the round;
- wherein the proof to each of the electronic devices includes proof that the request from a given electronic device was unknown to the other electronic devices before access to the electronic device resource was provided to the electronic devices, and that the requests of the other electronic devices were unchanged, including by the coordinator electronic device.

10. The method of claim 9, comprising:
- providing a time limit for electronic device resource requests;
- upon expiration of the time limit or upon receipt of requests from all participating electronic devices, providing the access scheme for access to the electronic device resource for each of the electronic devices; and
- equalizing access across the electronic devices to the electronic device resource to eliminate latency inequalities between the coordinator electronic device and the electronic devices.

11. The method of claim 10, wherein the time limit is sufficient for the electronic devices to provide respective requests.

12. The method of claim 10, wherein the processor is further configured to batch process the requests upon expiration of the time limit or upon receipt of all expected requests.

13. The method of claim 12, wherein a given electronic device provides a plurality of electronic device resource requests to be processed in the round.

14. The method of claim 10, wherein the time limit is dynamically adjustable.

15. The method of claim 10, wherein the time limit is adjustable for respective electronic devices based upon network latency between the coordinator electronic device and the respective electronic devices.

16. The method of claim 9, wherein:
- the requests and commitments from the electronic devices are cryptographically signed;
- the commitments as cryptographically signed are collected and shared to all of the electronic devices before access to the electronic device resource is granted; and
- validation access to the cryptographically signed requests is provided to all of the electronic devices to verify the access scheme.

* * * * *